United States Patent [19]

Moser

[11] 4,394,261
[45] Jul. 19, 1983

[54] SYSTEM FOR CONTROLLING CLARIFICATION OF BOILER FEED WATER AND THE LIKE

[75] Inventor: Henry D. Moser, Post Falls, Id.

[73] Assignee: Texaco Inc., White Plains, N.Y.

[21] Appl. No.: 355,007

[22] Filed: Mar. 5, 1982

[51] Int. Cl.³ .............................................. C02B 1/20
[52] U.S. Cl. .................................. 210/96.1; 210/138; 210/199
[58] Field of Search ...................... 210/96.1, 745, 138, 210/199, 709

[56] References Cited

U.S. PATENT DOCUMENTS

| | | | |
|---|---|---|---|
| 1,957,898 | 5/1934 | Mitchell | 210/96.1 |
| 2,299,529 | 10/1942 | Crampton | 210/96.1 |
| 2,925,912 | 2/1960 | Clark | 210/138 |
| 3,262,878 | 7/1966 | Beckley et al. | 210/709 |
| 3,421,624 | 1/1969 | Boyd | 210/96.1 |
| 3,542,674 | 11/1970 | Machlan | 210/709 |
| 3,605,775 | 9/1971 | Zaander et al. | 210/709 |
| 3,798,160 | 3/1974 | Huffman | 210/709 X |

FOREIGN PATENT DOCUMENTS

| | | | |
|---|---|---|---|
| 2031614 | 4/1980 | United Kingdom | 210/96.1 |
| 567462 | 8/1977 | U.S.S.R. | 210/96.1 |

*Primary Examiner*—John Adee
*Attorney, Agent, or Firm*—Carl G. Ries; Robert A. Kulason; Henry C. Dearborn

[57] ABSTRACT

A water clarification system for boiler feed water and similar applications. It employs a settling tank and adds a chemical to the inlet stream for causing precipitation of suspended matter. Clarified water is drawn off at an outlet near the surface. The system includes a sludge draw-off line with a valve for regulating the amount drawn. And, there is a small sized connection out from the tank at a desired level above the bottom, which is for drawing a continuous sample. Also, there is a back flush connection from the inlet stream into the sludge draw-off. Timing controls are applied to the sludge draw-off for periodically opening the valve if the sample indicates turbidity. Otherwise, the draw-off cycles are omitted. And, there is an override back flush cycle which is timed for keeping the sludge draw-off line clear.

2 Claims, 3 Drawing Figures

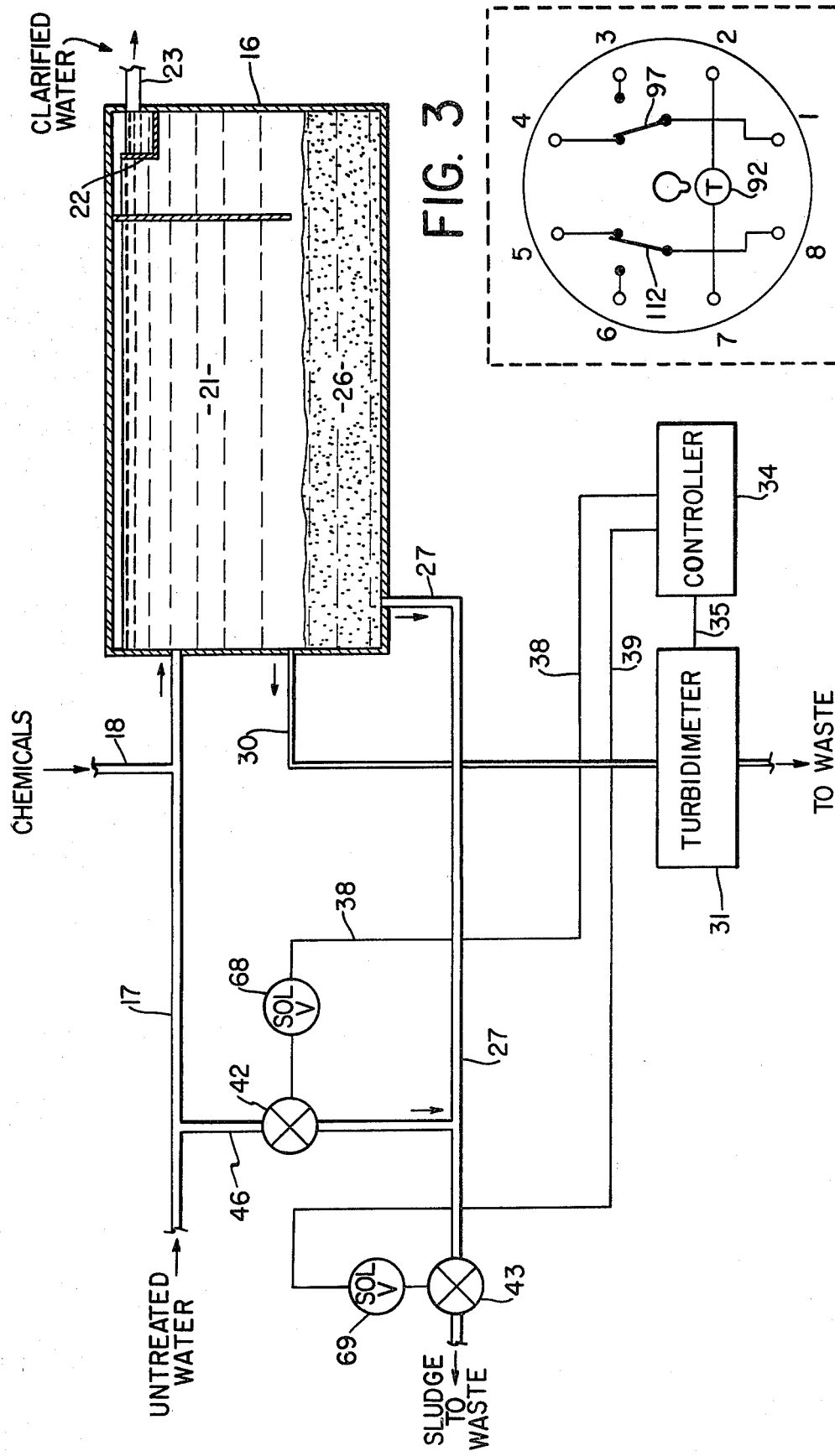

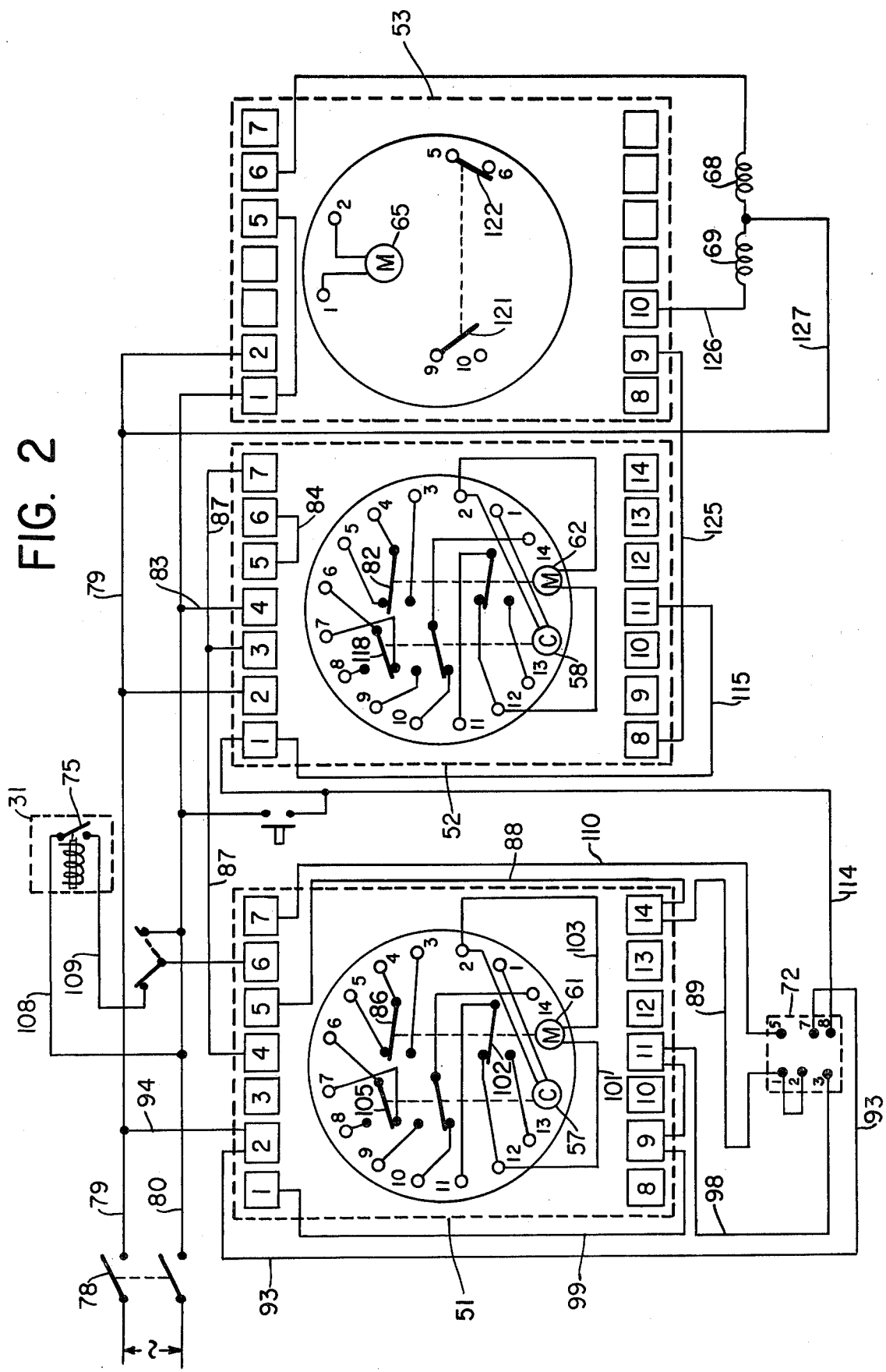

SYSTEM FOR CONTROLLING CLARIFICATION OF BOILER FEED WATER AND THE LIKE

BACKGROUND OF THE INVENTION

1. Field of the Invention

This invention concerns water clarification in general. More specifically, it deals with a system for controlling clarification of boiler water and the like.

2. Description of the Prior Art

It has been past practice to apply variable timers to make controlled procedures for drawing sludge away from a gravity water clarification system in which the removal of solids and particulates is accomplished by using chemical coagulants in the clarification process. However, with the introduction of polymers that are substituted for prior conventional chemical coagulants, the sludge removal control has become more critical largely because of the reduced volume of sludge that is produced.

Thus, it is an object of this invention to provide a system that gives variable control of the draw-off so as to adjust for variations in the volume of sludge produced.

Heretofore, there have been systems disclosed dealing with removal of turbidity from water or other liquids with solid suspensions therein, e.g., U.S. Pat. Nos. 3,262,878 to R. W. Beckley, et al, July 26, 1966 and 3,542,674, G. R. Machlan, Nov. 24, 1970. However, in those prior systems, there are filters being employed as principal elements therein. And, consequently, those systems are not particularly relevant to the applicant's invention.

SUMMARY OF THE INVENTION

Briefly, the invention concerns a system for controlling clarification of boiler feed water and the like, by precipitation. It comprises in combination a settling tank having an inlet and an outlet for said water, and means for adding a chemical to said inlet water to cause said precipitation. It also comprises means for drawing off precipitate from the bottom of said tank, and means for sampling water from said tank at a predetermined level above the bottom of said tank. It also comprises means for measuring turbidity of said sampled water, and control means for checking said turbidity at predetermined intervals and for activating said precipitate draw-off for predetermined intervals if said turbidity exceeds a predetermined minimum.

Again, briefly, the invention concerns a system for controlling clarification of boiler feed water and the like by precipitation. It comprises in combination a settling tank having an inlet and an outlet for said water, and means for adding a chemical to said inlet water to cause said precipitation. It also comprises a drain line and first valve means for drawing off precipitate from the bottom of said tank, and a small sampling line connected to said tank at a predetermined level above the bottom of said tank for continuously sampling water from said tank. It also comprises means for measuring turbidity of said sampled water, which means comprises a switch having a closed position if such turbidity exceeds a predetermined minimum and an open position if not. The invention also comprises means for backwashing said precipitate draw-off, which means comprises a second valve means for controlling flow through a connecting line between said inlet water and said drain line. And, the invention also comprises control means for checking said turbidity at predetermined intervals and for activating said first valve means for other predetermined intervals if said turbidity exceeds a predetermined minimum and for activating said second valve means at predetermined regular intervals. The said control means comprises first timing means for opening said first valve means for said predetermined intervals, and first circuit means for connecting said switch to said first timing means for activating said first timing means only when said turbidity exceeds said predetermined minimum. The said control means also comprises second timing means for checking said turbidity at said predetermined intervals, and second circuit means for connecting said second timing means to said first timing means for activating said second timing means whenever said turbidity switch is closed. And, said control means also comprises third timing means for opening said second valve means at predetermined regular intervals.

BRIEF DESCRIPTION OF THE DRAWINGS

The foregoing and other objects and benefits of the invention will be more fully set forth below in connection with the best mode contemplated by the inventor of carrying out the invention, and in connection with which there are illustrations provided in the drawings, wherein:

FIG. 1 is a schematic diagram illustrating a system to which the invention applies;

FIG. 2 is a schematic circuit diagram of the controller portion of the system illustrated in FIG. 1; and, FIG. 3 is a diagram illustrating the internal circuit elements of the time delay relay element shown in the FIG. 2 circuit.

DESCRIPTION OF THE PREFERRED EMBODIMENT

FIG. 1 illustrates a water clarification system according to the invention, which is particularly applicable to sludge draw-off for boiler feed water and the like. The system employs a clarification, or settling tank 16. It has an inlet line 17, through which the untreated water is introduced. There is a branch line, or conduit 18 which joins the inlet line 17 before it reaches the tank 16. And, through this branch line 18, the chemicals for causing precipitation of the fine particles, are added. The procedure is continuous. And, in the tank 16 there is a body of water 21 which has an outlet over a wier structure 22 located at the oposite end of the tank 16 from the inlet line 17. Consequently, the clarified water of the body of water 21 flows out through an exit conduit 23.

There is a quantity of precipitate 26 that settles on to the bottom of the tank 16. And, there is a draw-off line, or conduit 27 that leads out from the bottom of the tank 16. This, of course, acts for drawing off the precipitate 26 which has accumulated.

There is a small sized conduit 30 that acts as a sampling line for the water from tank 16. This sampling line, or conduit 30 is connected into the tank 16 at a predetermined level above the bottom of the tank. It is designed to permit a working bed of precipitate 26 to remain. And, a sample of the water 21 is continuously drawn from the tank 16 through the conduit or sampling line 30.

It may be noted that in the tank 16 there exists a definite interface between the clear water 21 and the precipitate 26. However, such interface is irregular, and it may be likened to a layer of cumulus clouds lying above the bottom of the tank. Thus, there is a substantial layer of still settling precipitate 26 that lies along above the bottom of the tank 16, and it is in this layer where the purification of the water 21 takes place.

The sample water is continuously drawn through the line or conduit 30, and it goes to a turbidimeter 31 which is used in controlling the level of the precipitate 26 in the tank 16. However, it has been found that direct control of the level of precipitate 26 by the turbidimeter 31 is not desirable since that would cause unstable operation largely because of the billowy nature of the precipitate, as indicated above. Consequently, there is a controller 34 which includes electrical timers that are indicated in more detail in FIG. 2.

The controller 34 receives a signal over a circuit connection 35 from the turbidimeter. Also, the controller 34 has control signal outputs over circuit connections 38 and 39 which lead to solenoid valves 42 and 43 respectively. The valve 42 is located in a conduit or line 46 which connects the inlet line 17 with the draw-off line, or conduit, 27. The other solenoid valve, 43, is in the draw-off line 27 and controls the draining, or drawing off of precipitate 26 from the bottom of the tank 16. As indicated by the caption, the flow or draw-off of precipitate 26 when valve 43 is open, carries the sludge to a waste disposal.

It may be noted that the valve 42 is for back washing to clear the draw-off line 27. That is done periodically. And, when it is open, the other solenoid valve 43 will be closed so that the backwash flow will go from the inlet line 17 to the line 27. Then, because the valve 43 is closed, the flow is in reverse through line 27 in the opposite direction from the draw-off flow of sludge.

The elements included in the controller 34 are indicated in the circuit diagram of FIG. 2. Such elements include three timers, 51, 52 and 53 that are indicated by dashed line enclosures in FIG. 2. Both timers 51 and 52 may take the form of commercial elements, e.g., electrical timers that are manufactured by Automatic Timing and Controls Company of King-of-Prussia, Pa. 19406, which is a division of American Manufacturing Co., Inc. These timers 51 and 52 may be the model designated series 305 E. Similarly, the timer 53 may be a commercial timer made by the same company. And, in this case, it may be a model designated series 306 E. In FIG. 2, the timers 51, 52 and 53 have internal and external circuits. These are indicated by the showings of terminal connections to which external circuits are made, that are numbered 1–14. There are corresponding internal circuits which include switches, as shown.

In the case of the timers 51 and 52, there is included in each case, in the internal circuits, a clutch element 57 and 58, respectively. These act when energized to control the two switches that are shown connected physically to the clutch by the dashed lines. Thus, when either clutch 57 or 58 is energized, it will switch both poles of the switch elements so as to change electrical connections from terminals 6 and 7 to terminals 7 and 8 for the upper switch (as viewed in FIG. 2), and from terminals 10 and 14 to terminals 9 and 14 for the lower switch.

Similarly, there are motors 61 and 62 in the timers 51 and 52, respectively. These control the other two switches in each case as is indicated by the dashed lines from the motors. In the case of the timer 53, there is a motor 65 that is connected internally by an electrical circuit between terminals 1 and 2, and the motor 65 controls the switches shown as indicated by the dashed line connections. Thus, the motor acts to open a switch between terminals 5 and 6 and close another switch between terminals 9 and 10. That takes place at periodic intervals whenever the motor 65 is energized. However, in the case of the timers 51 and 52, the motors 61 and 62 are not continuously energized as motor 65 is, because the external circuit connections are different.

It may be noted that there are solenoids 68 and 69 which are connected to the terminals 6 and 10 respectively of the timer 53. And, as will be explained more fully below, there solenoids are the actuators of the solenoid valves 42 and 43 respectively.

The FIG. 2 diagram also shows a time delay relay 72, the internal connections of which are shown in FIG. 3. Here again, it may be noted that there are numbers adjacent to terminal connections, and these correspond in each of the showings in FIGS. 2 and 3. This relay may be one manufactured by Automatic Timing and Controls Co., and preferably is the model designated as series 319 D by that company.

FIG. 2 also includes a schematic indication of the turbidimeter 31. It is indicated by a dashed line rectangle near the top of FIG. 2. It may be noted that turbidimeter 31 is a commercially available element which consists of a light source (not shown), a photoelectric cell (not shown), and suitable electronic circuits (not shown) in order to actuate a switch 75 that is illustrated in FIG. 2. As employed in a system according to this invention, the turbidimeter 31 acts so that when the sample water flowing through the turbidimeter via the small sized conduit 30 (FIG. 1), is above a predetermined turbidity, it will close the switch 75.

It may be noted that the switches in each of the timers 51 and 52 are shown in the positions which they take before the clutches 57 and 58 or the motors 61 and 62 are energized. Furthermore, the switches actuated by the clutches 57 and 58 are instantaneously switched upon energization of the corresponding clutch. While the switches actuated by the motors 61 and 62 are switched in accordance with time cycles which are determined by timer settings that relate to the running of the motors. In the case of the timer 53, it acts as a continuous time control which switches the contacts of one switch (between terminals 5 and 6) from closed to open while at the same time switching the other switch (between terminals 9 and 10) from open to closed. Then it switches both back to the original position after a predetermined time interval. This is the control which opens the backwash, or backflush, circuit described above in connection with FIG. 1 while disabling the controls for the sludge draw-off operations.

Operation

Broadly, the control system, according to this invention, includes the turbidimeter 31; three timers, 51, 52 and 53; and a time delay relay 72. When the system is turned on, the timer 51 starts and after a predetermined time, preferably about three minutes, this timer stops and causes a check on the clarity of the water as indicated by the tubidimeter 31. If the sample is clear, the timer 51 starts again and once more causes a check on the clarity of the water at the end of another time period. If the sample is cloudy, i.e., turbidity above a predetermined minimum, some precipitate needs to be drawn off. And, consequently, the draw-off valve 43 is opened and the timer 52 starts. When timer 52 stops after its predetermined time interval, which is preferably shorter than the interval as determined by timer 51, the draw-off valve 43 is closed and the timer 51 is restarted. The time delay relay 72 is employed to allow time for the switches and valves to operate.

Thus, it may be noted that the system employs relatively short periodic draw-off times which prevent too much precipitate being drawn off before checking the turbidimeter reading again. This makes sure that the sample was representative. In this manner, the action enables the height of the bed of precipitate 26 to be kept nearly constant even though the clarity of the samples as determined by the turbidimeter 31 has wide fluctuations from one test to the next. At the same time, at regular intervals the timer 53 continues to disable the draw-off control system while it opens the backwash valve 42 for clearing the draw-off line 27.

A representative cycle of the operation may be described in more detail largely with reference to FIG. 2 as follows. The control system is started by closing a switch 78 that energizes the main supply circuit connections 79 and 80. That starts the time delay relay 72 by completing the following circuit. From supply circuit connection 80, over a connection 83 to the terminal 4 of timer 52. Then over the internal connections from terminal 4 to terminal 5 (via a switch 82) and thereafter, over an external circuit connection 84, to terminal 6. From there the circuit continues over internal circuit connections to terminal 7. Then, it goes over connection 87 to the terminal 4 of timer 51. From there it continues over internal connections (via a switch 86) to terminal 5, and then via an external connection 88 to the terminal 14 of timer 51. It continues over another external connection 89 to terminals 1 and 2 of the time delay relay 72. Then this relay energization circuit continues from terminal 2 via internal circuits to a timing element 92 (FIG. 3) and from terminal 7, of the time delay relay 72, over an external circuit connection 93 (FIG. 2) to the terminal 2 of the timer 51. Then it is completed over a connection 94 back to the main power circuit connection 79.

After a short time delay (determined by the relay 72), an internal circuit (FIG. 3), which includes a switch 97, is shifted so that the internal circuit between terminals 1 and 3 is closed. This permits current flow to the terminals 1 and 11 of timer 51.

The details of the foregoing circuit which actuates the timer 51, may be traced from the main circuit connection 80 through connection 83 to terminals 4-5-6 and 7 of timer 52 and back over connection 87 to terminals 4, and 5 of time 51. From there it continues over external connection 88 to the terminal 14 of timer 51. Then, via external connection 89 to terminals 1 and 3 (now closed) of the time delay relay 72, and back to terminal 11 of timer 51 via a connection 98. Then, the circuit continues via an external connection from terminal 11 to terminal 9, and from there via another external connection 99 to terminal 1. From there, the circuit continues via internal circuit connections (from terminal 1) to the clutch 57 and back to terminal 2 and over the outside circuit connection 94 to the other supply circuit connection 79.

Simultaneously with the foregoing circuit which energized the clutch 57 of the timer 51, there is a parallel circuit beginning at terminal 11 of timer 51 and going to terminal 12 via internal circuit connection which includes a switch 102. Then this parallel circuit goes from terminal 12 to the motor 61 and back to terminal 2 via internal circuit connections 101 and 103, and then over the external connection 94 back to the main line circuit 79. This parallel circuit starts the timer motor 61.

At the same time as the timer motor 61 is started, the energization of the clutch 57 opens an internal switch 105 between terminals 6 and 7 (of timer 51) and this switch remains open until the timer 51 completes a cycle and stops. The time duration of a cycle of timer 51 may be varied, but as indicated above, is about three minutes.

At the end of a cycle of the timer 51, the switch 105 closes again which completes a circuit from the main circuit connection 80 through the turbidimeter 31 circuit via a connection 108 to one side of the switch 75 and then back over another connection 109 to the terminal 6 and via the switch 105 to terminal 7 of the timer 51. Then this circuit continues over an external connection 110 to the terminal 5 of the time delay relay 72. Relay 72 has now reset so that there is an internal circuit connection via a switch 112 (FIG. 3) to the terminal 8 of the time delay relay 72 and from there via an external connection 114 (FIG. 2) to terminals 1 and 11 of timer 52. Terminal 11 being connected from terminal 1 via an external connection 118.

It will be noted that if the switch 75 of turbidimeter 31 is closed, the foregoing circuit which is completed at the end of a timer 51 cycle, will serve to start the timer 52 in the same manner as the corresponding circuit connections started timer 51 as described above. However, when the timer 52 starts, it will actuate the clutch 58 so that the internal circuit between terminals 6 and 7 of timer 52 will be opened and therefore the timer 51 will not start again. But, if the sample is clear so that the turbidity is below a predetermined minimum, the switch 75 of turbidity meter 31 will remain open and consequently, the timer 52 would not be started. Instead the timer 51 would start again and the above described cycle would be repeated.

When the timer 52 starts, its clutch 58 is energized and consequently, an internal switch 118 is shifted and closes the internal connection from terminal 6 to terminal 8 of timer 52. That completes a circuit via the timer 53 during the intervals when the backflush circuit is not closed. Thus, during backflush conditions internal switches 121 and 122 of timer 53 are in the positions illustrated. However, during the other portion of the timer 53 cycles, the switches are in the opposite state.

Returning to the action when timer 52 is started, the circuit for actuating the solenoid 69 of valve 43 may be traced beginning at the main circuit line 80 over circuit connection 83 and through the terminals 4-5 of timer 52 and via external connection 84 to terminal 6. Then the circuit continues via an internal switch 118 (switched) to terminal 8 and then over an external circuit connection 125 to terminal 9 of timer 53. Then, the circuit goes over a now-closed switch 121 to terminal 10 from where the circuit goes over an external connection 126 to the solinoid 69 that actuates the valve 43. From the other side of solenoid 69, the circuit goes over a circuit connection 127 to the other main line circuit connection 79.

The foregoing circuit opens the draw-off valve 43 for draining sludge to waste, via the pipe or conduit 27. That circuit keeps the valve 43 open only so long as the timer 52 is operating. And, at the end of its cycle when it stops, it shifts the internal switch 118 back to the position that is illustrated. It may be noted that if the timer 53 is in its backwash portion of the cycle, the switch 121 (between its terminals 9 and 10) will be open so that the solenoid 69 of valve 43 will not have been energized and the valve will remain closed.

It will be observed also, that when the timer 52 completes its cycle and stops, the switch 118 will close the internal circuit between terminals 6 and 7 and this will again start the timer 51. Consequently, as long as the turbidimeter 31 indicates a need for drawing off the sludge (switch 75 closed) and the timer 53 is not in its backwash position, the system will continue its sludge removal timing cycles. The draw-off valve 43 will be open for the above indicated shorter time intervals as determined by the timer 52. Also, it will be closed for the above indicated longer time intervals of about three minutes as determined by the timer 51. It will be understood that the time intervals as determined by the timers 51 and 52, are adjustable.

As already indicated above, it will be clear that when the system is energized by closing the double-pole, single throw switch 78, the timer 53 will be activated and its motor 65 will be energized via the direct circuit connections 80 and 79 to the internal circuits from terminals 1 and 2 respectively, of the timer 53. Consequently, during regular intervals as predetermined by the setting of timer 53, the backwash circuit will be energized and the draw-off circuit will be disabled during such backwash times. During the intervals when the system is not backwashing, the controlled cycles as described above will continue and maintain the level of the precipitate 26 (FIG. 1) at a desired level without danger of having any upset which might drain all of the precipitate or otherwise adversely affect the system operation.

While a particular embodiment of the invention has been described above in considerable detail, in accordance with the applicable statutes, this is not to be taken as in any way limiting the invention, but merely as being descriptive thereof.

I claim:

1. In combination with a system for controlling clarification of boiler feed water and the like by precipitation, said system comprising a settling tank having an inlet and an outlet for said water, means for adding a chemical to said inlet water to cause said precipitation, a drain line and first valve means for drawing off precipitate from the bottom of said tank, a small sampling line connected into said tank at a predetermined level above the bottom of said tank for continuously sampling water from said tank, means for continuously measuring turbidity of said sampled water, comprising a switch having a closed position if said turbidity exceeds a predetermined minimum and an open position if not, and means for backwashing said precipitate draw-off, comprising a second valve means for controlling flow through a connecting line between said inlet water and said drain line while said first valve means is closed, timing and control means for checking said turbidity at first predetermined intervals and for activating said first valve means for second predetermined intervals if said turbidity exceeds a predetermined minimum and for activating said second valve means with disabling of said first valve means at third predetermined regular intervals, said timing and control means comprising first timing means for opening said first valve means for said second predetermined intervals, first circuit means for connecting said turbidity switch to said first timing means for activating said first timing means only when said turbidity exceeds said predetermined minimum second timing means for checking said turbidity at said first predetermined intervals, second circuit means for connecting said second timing means to said first timing means for activating said second timing means whenever said turbidity switch is closed, and third timing means for opening said second valve means at said third predetermined regular intervals.

2. The invention according to claim 1, wherein said means for backwashing also comprises third circuit means for disabling said first valve means during said third predetermined regular intervals.

* * * * *